United States Patent
Sprott et al.

(10) Patent No.: US 9,562,362 B2
(45) Date of Patent: Feb. 7, 2017

(54) APPARATUS FOR CONSTRUCTION OF SAFETY MATS

(71) Applicant: Matta I Limited, Auckland (NZ)

(72) Inventors: Thomas James Sprott, Auckland (NZ); Warren Andrew Lauder, Otaki (NZ); Paul Harris, Auckland (NZ); Adrian James Sprott, Auckland (NZ)

(73) Assignee: MATTA I LIMITED, Auckland (NZ)

(*) Notice: Subject to any disclaimer, the term of this patent is extended or adjusted under 35 U.S.C. 154(b) by 24 days.

(21) Appl. No.: 13/848,383

(22) Filed: Mar. 21, 2013

(65) Prior Publication Data

US 2013/0212964 A1 Aug. 22, 2013

Related U.S. Application Data

(62) Division of application No. 12/696,858, filed on Jan. 29, 2010, which is a division of application No. 11/641,907, filed on Dec. 20, 2006, now abandoned.

(51) Int. Cl.
*B32B 3/02* (2006.01)
*B29C 65/78* (2006.01)
(Continued)

(52) U.S. Cl.
CPC ..... *E04F 15/02155* (2013.01); *B29C 65/3424* (2013.01); *B29C 65/72* (2013.01); *B29C 65/7841* (2013.01); *B29C 66/1142* (2013.01); *B29C 66/43* (2013.01); *B29C 66/71* (2013.01); *B29C 66/91213* (2013.01); *B29C 66/91214* (2013.01); *B29C 66/91221* (2013.01); *B29C 66/91231* (2013.01); *B29C 66/91313* (2013.01); *B29C 66/91315* (2013.01);
(Continued)

(58) Field of Classification Search
USPC ............. 428/57, 58; 156/349, 379.6, 379.7; 52/223.7, 309.16, 582.1
See application file for complete search history.

(56) References Cited

U.S. PATENT DOCUMENTS

| | | |
|---|---|---|
| 1,795,525 A | 3/1931 | Trautner |
| 2,372,929 A | 4/1945 | Blessing |

(Continued)

FOREIGN PATENT DOCUMENTS

| | | |
|---|---|---|
| JP | 57070612 | 5/1982 |
| JP | 06064043 | 3/1994 |
| JP | 10016061 A | 1/1998 |

OTHER PUBLICATIONS

"Play Matta the Next Generation of Playground Surfacing", from gpioutdoordesigns.com May 2005.
Machine translation of JP 10-016061 date unknown.

*Primary Examiner* — Aaron Austin
*Assistant Examiner* — Brian Handville
(74) *Attorney, Agent, or Firm* — Young & Thompson

(57) ABSTRACT

An array of resilient floor tiles is assembled into a continuous sheet after being laid down. An array of included, sacrificial resistive wires is buried along the edges of the tiles and is controllably heated in order to cause welding of the edges of tiles across the paths of the wires to neighboring tiles. Subsequently the wires may be used to give the array integral tensile strength. The welded array is provided with greater strength for resisting use, expansive and contractile forces caused by environmental heat and cold and also long-term tile contraction owing to loss of plasticizer as may be seen with PVC-based tiles.

7 Claims, 4 Drawing Sheets

Figure 1:
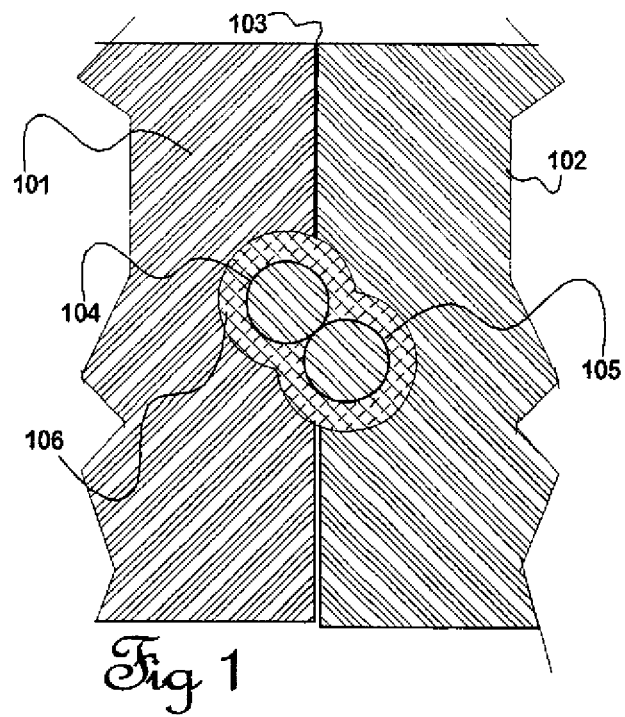

(51) Int. Cl.
    B29C 65/72      (2006.01)
    B29C 65/00      (2006.01)
    B29K 101/12     (2006.01)
    B29C 65/48      (2006.01)
    B29K 27/06      (2006.01)
    B29C 65/34      (2006.01)
    E04F 15/02      (2006.01)
    B29C 65/10      (2006.01)
    B29K 105/00     (2006.01)
    B29C 65/04      (2006.01)
    B29K 21/00      (2006.01)
    B29K 305/12     (2006.01)
    B29C 65/14      (2006.01)
    B29L 31/00      (2006.01)
    B29C 65/20      (2006.01)
    B29C 65/08      (2006.01)
    B29K 105/16     (2006.01)

(52) U.S. Cl.
    CPC ........ *B29C 66/91317* (2013.01); *B29C 65/04* (2013.01); *B29C 65/08* (2013.01); *B29C 65/10* (2013.01); *B29C 65/14* (2013.01); *B29C 65/1412* (2013.01); *B29C 65/1425* (2013.01); *B29C 65/20* (2013.01); *B29C 65/342* (2013.01); *B29C 65/348* (2013.01); *B29C 65/3432* (2013.01); *B29C 65/48* (2013.01); *B29C 66/0042* (2013.01); *B29C 66/3034* (2013.01); *B29C 66/8122* (2013.01); *B29C 66/81821* (2013.01); *B29C 66/81871* (2013.01); *B29C 66/919* (2013.01); *B29C 66/91212* (2013.01); *B29C 66/91421* (2013.01); *B29C 66/944* (2013.01); *B29C 66/949* (2013.01); *B29K 2021/00* (2013.01); *B29K 2027/06* (2013.01); *B29K 2101/12* (2013.01); *B29K 2105/0032* (2013.01); *B29K 2105/0038* (2013.01); *B29K 2105/16* (2013.01); *B29K 2305/12* (2013.01); *B29K 2905/02* (2013.01); *B29K 2905/10* (2013.01); *B29L 2031/7324* (2013.01); *E04F 15/02* (2013.01)

(56)  References Cited

U.S. PATENT DOCUMENTS

| | | |
|---|---|---|
| 2,647,072 A | 7/1953 | Smith |
| 3,836,136 A | 9/1974 | Davis |
| 5,407,520 A | 4/1995 | Butts et al. |
| 5,632,845 A | 5/1997 | Stehle et al. |
| 5,788,789 A | 8/1998 | Cooper |
| 6,363,671 B1 * | 4/2002 | O'Mara ............ 52/223.7 |

* cited by examiner

APPARATUS FOR CONSTRUCTION OF SAFETY MATS

FIELD

This invention relates generally to apparatus and methods for assembling thermoplastic or elastomer materials, and to construction of resilient playgrounds or safety mats made of tiles. In particular the invention refers to means for assembling and co-adhering an array of laid-down tiles made of a poly vinyl chloride plastics composition.

BACKGROUND

This invention relates to resilient playground or floor (safety) mats, as embodied in the applicants' products most of which are made up of arrays of square tiles, 0.5 meter along an edge, made of a resilient material such as polyvinyl chloride (PVC) cast in moulds including perforations and surface detailing, so that the tiles have improved grip and resilience properties. Such PVC mats may include plasticisers, fillers, and colouring material and may include conductive material. Mats are intended to lie flat on a substrate and be attached by their edges to neighbouring tiles. Interlocking complementary lugs and pockets are of assistance. It has been found that more extreme environments such as outdoors in North America have been causing unexpected expansion/contraction of playground mats as a result of temperature changes. In addition a loss of dimension over a period of years is known to occur because of the gradual loss of the significant amount of plasticiser incorporated with the plasticiser. (Typically, about 20% by weight of flexible PVC is a plasticiser such as dioctyl phthalate. This substance can diffuse through the mass of the PVC). As a result, the glued joints become infiltrated with plasticiser. The inventors have realised that glued joints can be expected to fail when the plasticiser migrates into the glue itself, over time, and causes weakening of the joint. As a result, tiles lift off the substrate and/or separate from each other. Of course, the invention is in no way limited to use with the applicant's tiles; the above problem has merely stimulated the research that resulted in this invention. Many other articles constructed from plastics are amenable to a welding treatment according to the invention, as will shortly be described.

PROBLEM TO BE SOLVED

The problem to be solved could be stated as providing a permanent join between parts made of a plastics material where glued joins have been found to be weak and of short life. The inventor's particular desire is to halt any tendency of tiles to lift off the substrate and/or to separate from each other. One response would be to render the body of the tiles less prone to expansion or contraction, but as yet no economical solution having this effect has been found. Another solution is to provide better adhesive procedures including use of melted and then flowed-together plastics material; that is, welds. A further solution is to include tough fibrous material that traverses parts such as an array of tiles, having sufficient tensile strength to hold the tiles in place despite the forces of contraction or expansion.

PRIOR ART

U.S. Pat. No. 6,520,790 (Sumitomo Wiring Systems) teaches a method for waterproof lighting fixture assembly in which wiring is at first continuously routed through one or more sockets and then after a heat-welding process using resistive heating of the wire that melts a sealing material on to the wiring, the wires are cut at the sockets so that the same wire can supply power to lamps inserted in the sockets. This is a dual use of the same wire; first in an assembly phase then in a normal-use phase.

U.S. Pat. No. 6,676,861 Van Der Werf et al suggests that "the wire" as we later define it could be coated with various granules including coloured granules, for joining linoleum. The coated non-metallic cord of this invention does not include means for internal (resistive) heating.

There is a known technique in which a wire embedded in rubber windscreen mouldings of automobiles is heated in order to vulcanise the rubber. The wire is left in place.

OBJECT

It is an object of this invention to provide arrays of safety floor tiles or particularly play mats having a better capacity to stay united, or at least to provide the public with a useful choice.

STATEMENT OF INVENTION

In a first broad aspect this invention provides means for construction of an array of thermoplastic safety floor mats or play mats upon a substrate or surface; wherein heating means capable of causing the thermoplastic material to soften at least in a localised area is employed to cause the mats of the array to become linked or welded together along their edges, so that use of a glue is avoided.

In a first related aspect this invention provides means for the joining together by welding of an array of safety floor mats or play mats by their edges upon a substrate or surface; wherein heating means consisting of an electrically conductive elongated member having tensile strength is placed along at least one edge of a first tile between an upper surface and a lower surface of the tile and adjacent a second tile to which the first tile is to be joined, the adjacent edges comprising what is or will become a seam; the elongate member being capable of being heated by the passage of electric current in order to cause welding together of the first tile and the second tile along the seam.

In a second related aspect this invention provides an electrically conductive elongated member comprising a wire comprised of a metal or a metal alloy, having tensile strength and electrical conductivity.

Preferably the elongated member is composed of a stainless steel wire.

Alternatively the wire can be comprised of other conductors having tensile strength, including "Nichrome" alloys.

More preferably the wire includes at least two stainless steel wire strands twisted together, so that the combination produces a given amount of heat at a higher current but lower voltage yet retains more flexibility than a single thicker wire.

Optionally the wire is coated with compounds capable of enhancing the welding process.

Optionally the wire is coated with materials capable of increasing the effective diameter of the wire so that there is less tendency for the wire to pull or be pulled from its location.

Alternatively the wire is configured so that its surface includes projections.

Optionally the wire may be laid in a pattern which traverses more than one length of tile-tile weld, or intended weld, by returning to the source along the same or a different folds back onto itself.

Optionally, the wire is provided with a number of short sleeves of an insulating material so that perpendicular crossover of wires does not carry current. One material suitable for a sleeve is shrink-wrap insulation.

In an alternative aspect the initial or a remedial welding process is provided by an alternative heat source: the local application of heat along the seam from a source of energy in contact with a surface overlying the seam.

Preferably the source of energy comprises a source of heat within a metal block.

In a second broad aspect the wire, which remains in place, is used also as a tensile reinforcing member within the array of safety floor mats or play mats by connecting each end of a length of wire to an anchoring means attached to the ground, each anchoring means being capable of holding the wire under a controlled amount of tension.

Optionally at least some of the tiles are provided with longitudinal edge grooves for holding the wire along their edges, although ungrooved tiles are satisfactory.

Preferably enough wires are included in an installed array of tiles to surround all edges of each tile of the array with a weld-capable retaining wire.

In a third broad aspect the invention provides apparatus for supplying the elongated conductive members with a welding current; the apparatus comprising means for generating the delivered current and controlling the delivered current.

Preferably the apparatus includes means for indicating the delivered current and for controlling the time of delivery and displaying the subsequent recommended cooling time, and connecting means for joining more than one wire to the current supply apparatus.

In a fourth broad aspect the invention provides a method for providing a more secure array of resilient tiles for play and/or safety purposes, the method including the steps of:—
1. laying the array of tiles upon a prepared surface, optionally but not often including an underlying adhesive;
2. laying lengths of the wire across the array, within every inter-tile groove;
3. laying lengths of the wire along the array, within every inter-tile groove;
4. in both cases leaving sufficient protruding wire at both ends for electrical connection to be made and for subsequent ties to be made;
5. optionally adding weld-enhancing materials,
6. applying an electric current from one end of each wire to the other in order to cause resistive heating for the wire sufficient to reach a welding temperature, and holding the temperature for an effective duration, so that adjacent tiles become welded by their edges to adjacent tiles,
7. allowing the weld to cool, and then optionally . . .
8. exteriorising the ends of each wire
9. coupling each free end of the wire to a retainer attached to the prepared surface or the adjacent ground and applying controlled tension to the coupling.

In a fourth broad aspect the invention provides a group of means for the local application of heat along two adjoining edges, so that the edges are raised to a welding temperature of between 130 and 190 degrees Celsius, and then brought firmly together so that the edges fuse and remain fused after cooling down.

Preferably the group of means for local application of heat includes hot air blowers, heated contact elements, ultrasonic energy, radio-frequency heating (including microwave heating), and infra-red heating; all adapted for the application of heat to a localised strip along the edges of adjoining items made of a poly vinyl chloride plastics material; and used either alone or in combination with other means.

Preferably the group of means for local application of heat are used in conjunction with head localising devices including air controlling barriers, ultrasonic transducers of controlled shapes, radio frequency electrodes, microwave applicators, and infra-red reflectors and directors, so that the heat is restricted to a localised area to be welded.

A preferred microwave frequency is in the range of either about 915 MHz or about 2.4 Ghz).

In a fifth broad aspect the invention provides for the use of a plastisol glue as defined elsewhere in this specification, either separately or together with methods previously described in this section; the plastisol glue being first placed in the area to become welded, and then heated to a temperature sufficient to cause the sol to melt and become converted into a mass of poly vinyl chloride material.

Preferred heating means include the heating of embedded wires, hot air blowers, heated contact elements, ultrasonic energy, radio-frequency heating (including microwave heating), and infra-red heating;

PREFERRED EMBODIMENT

The description of the invention to be provided herein is given purely by way of example and is not to be taken in any way as limiting the scope or extent of the invention.

DRAWINGS

FIG. 1: is a diagram showing a section of a tile near one edge, including the wire ready for use in its first function of welding.

Figure 2:

FIG. 2: is an illustration of a wire as used.

Figure 3:
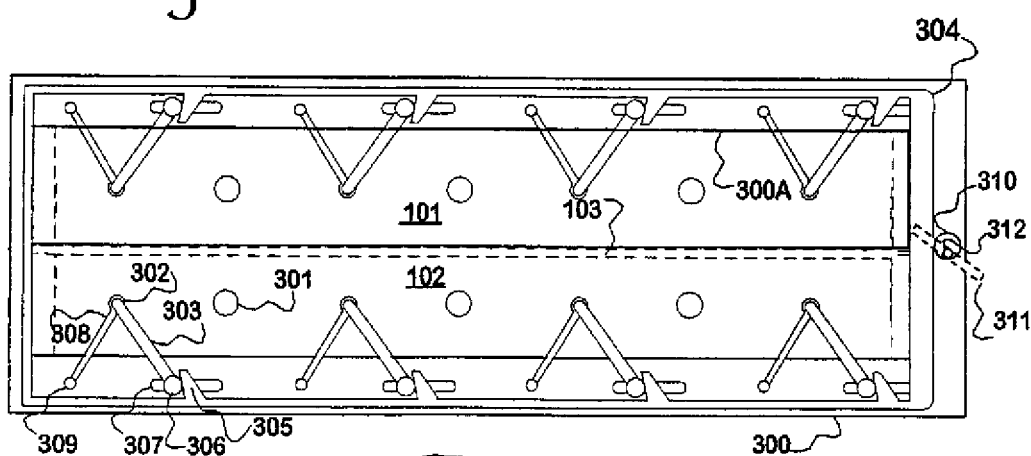

FIG. 3: is a plan view of one clamping device to force tile edges together while applying heat to the seam to be welded.

Figure 4:
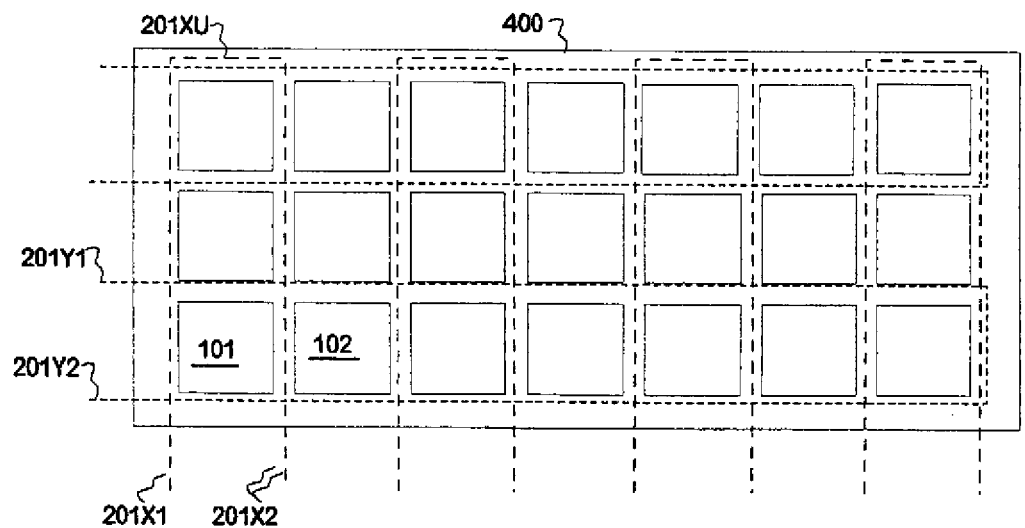

FIG. 4: is a diagram showing the layout of wire welding wires within a matrix of tiles.

Figure 5:
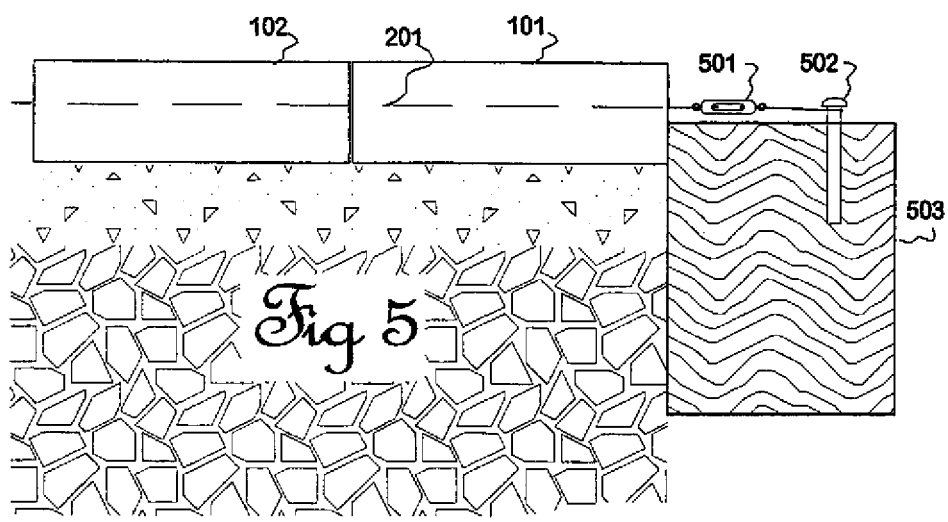

FIG. 5: shows tying down of the wire after completion of welding, for the second function 160 of holding tiles against the ground under some tension.

Figure 6:
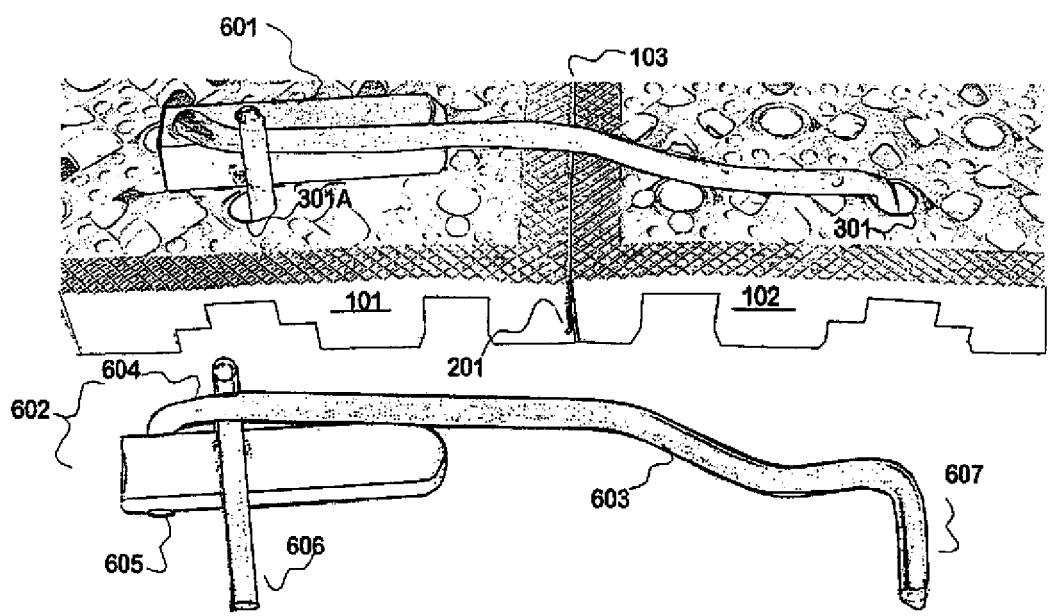

FIG. 6: a perspective drawing showing an over-centre action type of clip; a second device for forcing tiles together during welding by pegs that enter holes.

Figure 7:
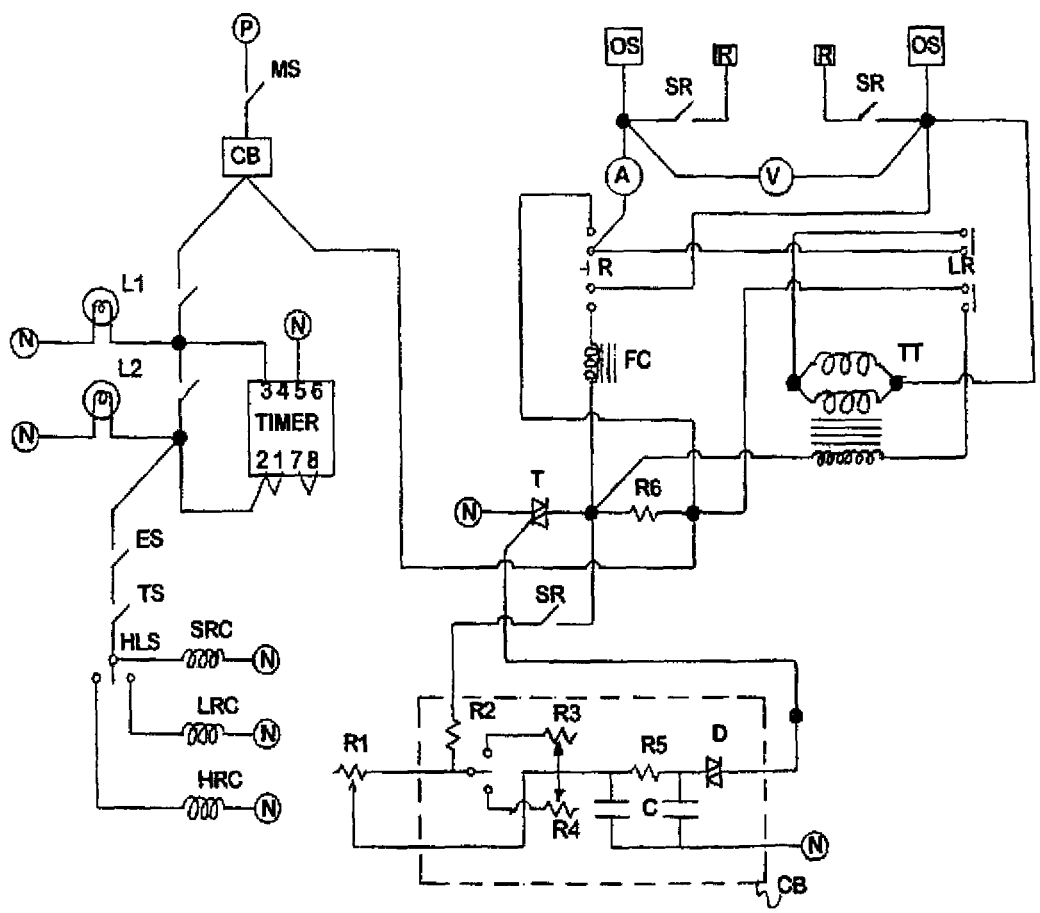

FIG. 7: is a circuit diagram for a power supply suitable for providing power to welding wires.

EXAMPLE 1A

The welding and holding wire central to this Example is laid along the seams between an array of flexible PVC-based tiles as sold by the inventors under the trade mark "PLAY MATTA" when laid down for use upon a substrate. The wire has two main purposes: (1) for welding use during installation, when it provides the localised intense heat for a mat welding procedure, and (2) for use after installation when the tensile properties of the wire are used to hold the array of tiles together, and also down on to the underlying substrate despite forces tending to pull the tiles away; including thermal expansion and contraction, contraction on volatilisation of plasticiser, and applied forces.

The applicant usually provides tiles either in single units (0.5 meters square), or as one-meter pre-welded squares each holding four tiles (size information by way of example only).

FIG. 1 shows in section the abutting edges of two safety tiles 101, 102 each of which are made of a thermoplastics material such as PVC (polyvinyl chloride) including about 20% dioctyl phthalate or equivalent as a plasticiser, with colorants, fillers, blends and other additives. (That is the plastics material assumed in this illustrative and non-limiting example of the patent). Some kinds of tiles may also include complementary lugs and pockets along their apposed edges. The two tiles of FIG. 1 have been welded together by heat generated by resistance to a flow of electricity passed through the wires 105, 104 (preferably a twisted pair) causing melting and later resolidifying of the surrounding area 106. An option of a groove between the tiles, possibly useful for pre-locating the wires, can be dispensed with, especially if compression is applied across the joint during the welding process so that the space occupied by the wire before heating is taken up by their melting into the bodies of the adjacent tiles. Usually, an installer will insert the wire into the space after the tiles have been first placed on to the substrate, probably inserting it with the help of a depth-determining tool like a miniaturised mole plough. It is useful for the wire to be laid straight, without kinks and at a reasonably constant height so that tension can subsequently be applied.

A desired welding process has a cycle length of 5 to 8 minutes at a power input in the range of about 100-150 watts per meter. The actual temperature reached has not been measured, but is less than the decomposition temperature for PVC and is probably 140-180 deg C. The power supply of Example 1E may be adjusted in order to provide this amount and duration of heating power.

EXAMPLE 1B

The Wire

FIG. 2 shows detail of the wire used. The presently preferred wire is a stainless steel wire, preferably a soft-temper 304 alloy stainless steel, supplied as a twisted pair (strands 201 and 202) of wires each having a preferred thickness of about 18, 20 (about 0.88 mm diameter), or 22 gauge is preferred. (Other alloys such as 316 may be used as substitutes, and less or more than two strands could be used.) A greater number of strands of wire is more flexible than a lesser number for a given total cross-section. Single strand wire is an acceptable equivalent. Stainless steel (one of several alloys of mainly iron with chromium) has a relatively high electrical resistance compared to copper. Resistance wire or "Nichrome" (a trade mark of Driver-Harris Company, Chicago) is another option (one of several alloys of nickel with chromium) having about twice the specific resistance of stainless steel. Iron wire, or high-tensile galvanised (or otherwise zinc-coated) steel wire is not advised for use with PVC tiles because of the usual release of free hydrochloric acid from the plastics mass during heating of PVC to the working temperatures expected. The acid then reacts with the zinc coating and the underlying iron, which results in rust stains upon the tiles and destroys the wire's mechanical properties. Some alloys of stainless steel may also be relatively vulnerable to hydrochloric acid. Steel may be suitable for use with other weldable resilient plastics and elastomers.

An option of providing a thick coating of relatively meltable granules applied to the wire or to the tile edge before the welding process has been considered, but subsequent migration of plasticiser may weaken this material a while after it has formed an adhesive, and it comprises an extra step in manufacture over simply welding with the bulk material of the tiles. Perhaps tile pressure could be realised within a confining outer frame by weighting the slightly oversize tiles down. Clips are not essential.

EXAMPLE 1C

Clip Apparatus for Closing the Seam

Temporary clips or other devices to pull the seam shut during the welding process and hold it shut in compression until the weld has cooled are desirable. One device is a pair of rows of lever-actuated pushing rods that engage with existing holes through the tiles, as shown in FIG. 3. A frame having a central clear aperture about 600 mm (25 inches) long is provided so that an iron (to be described later) can freely access all of the seam between two tiles (101, 102) to be welded without obstruction of the seam by clips.

The seam compressor shown in plan view (top view) in FIG. 3 is mounted on a rectangular steel base plate 300 having a rectangular aperture 300A that is about 600 mm long. This example device makes use of the holes 301 that are already included as an array over the surfaces of the tiles 101, 102. The device includes a peg 302 at the end of each member 303 which are first engaged in the holes in the tiles and then made to traverse towards each other across the seam 103 by forcing the pushing frame 304 to move across the surface of the plate 300 from right to left, as shown in FIG. 3. The pushing frame includes a plurality of inwardly directed pegs 305 (slope exaggerated) each of which pushes against a short vertical shaft 306 that is constrained to move only longitudinally by virtue of being engaged in slot 307. The pegs 302 are forced to move in an arc around pivot point 309 by being coupled to that pivot point by rigid beam 308. 303 and 308 may be regarded as a leaf hinge as seen from one end. All the pegs move in synchrony so that moving frame 304 to the left causes the seam 103 to be pushed shut. When shut it may be manipulated so that both sides lie at the same height, so that a 0.5 meter long heated iron as described later in this section can make contact with the entire length of the seam 103 between two tiles and compress and weld it. A series of seam compressors are placed along the full length of a seam to be welded—perhaps using 25 individual seam compressors. Means to cause frame 304 to move, forcefully, to the left my be as shown at 310 (the eccentric cam), 312 (a short vertical shaft which turns within a hole directly beneath, in the plate 300, and 312, a handle for turning the eccentric cam device; all shown from straight above. Such means could comprise (a) an eccentric cam mechanism fixed to the base place 300 (see later), (b) a "knee" type lever system, (c) a rotating advance screw. In practice (d) a hydraulic or air-driven ram might provide the movement in a convenient and economic manner. This device assumes that the resilient tiles themselves provide sufficient give (resilience) to take up minor differences in position. If that is insufficient, beam 303 may be made of a springy steel that has a suitable amount of give for the expected force. This drawing illustrates the principles of clamping devices but has not resolved the matter of providing a single long clear aperture along perhaps up to 30 meters of seam. The device shown is more particularly suited to use of a hot "iron" rather than an internal heated wire.

If an iron is not likely to be used, a simpler version of clamps for holding the tiles close together along the seam may be made. See the perspective drawing of FIG. 6. These example clamps (602, shown loose on a surface, and 601, shown tightened in place) use an over-centre action lever to hold the seam closed during welding between two steel pegs 606 and 607 which are inserted into holes 301A and 301 in adjacent tiles 101 and 102. ("Over-centre" as used herein means that the clip is held in place by being tightened beyond a peak value of tightness and is then held at a mechanical stop; the resilience within the tiles maintaining the clip in position). When the handle 605 is turned anti-clockwise around the peg 606 that is welded to the handle, the far end of the curved steel rod 603 that comprises peg 607 is moved further from peg 606 because the near end is pivotally mounted through the handle 606 (emerging at 605 in the drawing). The rod 603 has been specifically dimensioned for use with the pattern of tiles used in 101 and 102. On tightening, the horizontal curve of rod 603 at 604 reaches around the axis of peg 606 and comes to a halt when the rod 603 contacts peg 606, just after having maximally compressed the tiles. The tile edges are compressed together around wire 201 that has been placed within the seam 103.

EXAMPLE 1D

Apparatus for Heating the Wire: General

Apparatus for supplying the welding current is described here. Environmental conditions and working voltages and currents must be considered in relation to operator safety since potentially lethal amounts of current are used. A motor-driven generator may be preferred, being portable, inherently isolated from ground, and being a variable power supply. Isolating transformers and return-current detection circuit breakers are of assistance if the utility power is used. About 12 volts RMS per meter of seam, at a current within a range of about 5 to 20 amperes (depending on the resistance per unit length of the wire used) is required to be supplied for a duration of 5 to 8 minutes. A constant-voltage power supply is preferred over a constant-current type, using the negative temperature dependence of resistance of a metal for some auto-regulation. A mains-driven arc welder can be used if suitably calibrated. DC power is acceptable except that it is more difficult to control cheaply: because of factors such as switch derating and non-availability of transformer or phase-controlled rectifier (Triac) controls for instance. The power supply may be required to produce from 6 volts to, for a 20-meter span, over 240 volts (measured as RMS voltage across the length buried between tiles) depending on the length of seam between tiles to be welded at any one time. A selectable transformer tapping may be the most reliable way to achieve the variable voltage although solid-state devices are preferred options and are amenable to automatic control. The operator would be required to select the closest tapping or power setting for the wire length and type in use. The current should be delivered in a controlled manner over a period so that the result is melting and welding, rather than overheating and charring of the materials surrounding the wire (the welding wire) if too much current is used. The operator would be instructed never to overheat a seam—which would char it and require replacement of adjoining tiles. Underheating would fail to weld the tile material.

Ideally there would be a display device to show (a) the progress (time elapsed) of the welding cycle, (b) that current is flowing properly, and (c) the status of delivered power. A temperature probe may be used. Signalling the end of a suitable cool-down period at the end of a weld is also important, in case under-skilled workers try to rush the process and pull the retaining clips out too soon.

EXAMPLE 1E

Circuit of Apparatus for Heating the Wire

This presently preferred circuit relies on an alternating-current source, such as a motor generator as would be used in the field (or alternatively use of a large isolating transformer) to ensure isolation of the power from the general ground, and hence safety. 230-250 volts is generally required to match power transfer to a desirable welding wire thickness, and length, rather than the perhaps more obvious 110 volts, for which wire thickness has to be increased significantly (hence raising cost and using a stiffer wire which is hard to handle). Continuously variable heating control is provided with little heat dissipation by phase control (using the circuit board (CB) and the phase shifting components mounted on it) of a "Triac" solid-state device. A snubberless type is preferred since it commutates better when driving an inductive load. A purely resistive load (R6) is also provided since this power supply includes a step-down transformer for better control over short lengths of wire. That second range of heating currents is made using the 6.6:1 step-down toroidal power transformer (TT), for use on short lengths of welding wire. The controller is provided in a box having a lid. Some parts are mounted under the lid; others on the base. Meter measurements of delivered voltage and current are provided, and timer action is indicated by the two lamps. The circuit of FIG. 7, together with the accompanying list of components and this introduction shall be understood as a group by one of skill in power electronics.

The "Omron HC3A" timer ensures accurately repeatable yet variable-length applications of heating current by time, and the control R1 is used to apply an amount of heat according to the amount of resistive wire in use at any time, so that the workman's job is simplified. In effect, the circuit on the left represents means to energise the selected portions of the circuit on the right for a controlled period by the mechanism of relay coil power (coils SRC, and either LRC or HRC are energised). Conventional "TRIAC" triggering circuitry is provided along with a 50 or 60 Hz frequency selection switch.

Parts List A: Components Mounted on the Lid
P Input 230 Volts single phase AC; 50-60 Hz (such as from a motor generator, effectively isolated from ground), or (with proper safety considerations) across two phases of a 3-phase 117 volt supply).
MS Main switch
CB Circuit breaker (16 Amp C curve 10 kA)
ES Emergency switch—dual contacts
N Connection to a neutral bus (wiring between (N) is omitted for clarity)
L1 Green neon light, indicating "power on"
L2 Amber flashing light indicating "heat is being applied"
SS Start switch—normally open
TS Test switch—normally closed
HLS High/Low power switch
SRC Signal relay coil
LRC Low power relay coil
HRC High power relay coil
Timer (Omron, Japan # HC3A, or equivalent)
B: Components Mounted on Base
OS Output socket (x2); the welding wire is connected across these.
R Resistance test point (x2); the welding wire resistance may be tested across these.
SR Signal relay contact
A Ammeter (20 Amp O/S 40 moving iron AC)

Voltmeter (250 Volt AC moving coil)
HR High power relay contacts (double pole)
LR Low power relay contacts (double pole)
FC Ferrite choke
TT Toroidal transformer (6.6:1 step-down/500 VA) for controlled low voltage outputs.
T Triac (25 Amp—snubberless. Example: BTA06-600BW (SGS-Thompson))
R1 Control potentiometer (500K)
R2 3K3
R3 1M (50 Hz setting)
R4 1M (60 Hz setting)
R5 15K
R6 1K5 (50 watt) This assists when driving inductive loads.
FS Frequency changeover switch
C 100 pFMylar (2 off)
D Diac
N One of a number of connections to a neutral (or one phase) bus.
Notes: Two SR contacts for resistance testing are normally closed. One SR contact feeding the circuit board is normally open. Black dots represent stud terminals. "N" in a circle represents each of a number of connections to a neutral bus.

EXAMPLE 1F

Other Heating Methods

A: A hand-held hot-air blower might be used for local additional heating, such as for patching use after the main process has been completed. Since the air heats only the upper surface it would be usefully complemented by sub-surface wire heating.

B: The most straightforward of many alternative processes is thermal conduction from an internally heated metal block device (herein called "an iron") which is a simple and effective method such as for patching a playground surface by welding if a tile needs to be replaced. It also heats only the upper surface of adjoining tiles. The compressing clip system would be used at the same time. In some cases, access to the welding wire may be inaccessible, or may not have been used. One must remember that the workmen need simple, reliable and easy-to-understand equipment. This description of a prototype iron is given by way of example. A rectangular bar of copper or aluminium, 25 mm×25 mm×0.5 meters (1 inch×1 inch×20 inches) is used. Copper is heavier and a better thermal conductor than aluminium. The bar is drilled out axially lengthwise in order to accommodate two resistive heater units each rated at about 500 watts at the local mains voltage (117 or 240 volts), or as generated by a motor generator. In this case electrical isolation between the heating element and the metal block is reasonably likely and can be checked by means of a residual current sensing device. Example heaters are 5 to 6 mm diameter. The bar is also milled lengthwise along what will become the top surface in order to accommodate the metal bulb of a thermostat, placed so that it samples an average of the temperature of the bar. (A thermocouple, read by a circuit within the power supply unit, is preferred for production units. Fail-safe means include testing for open circuited thermocouple wires and use of a backup thermocouple to sense over-temperature conditions. The bar is covered with insulating material on all but the base. A sheet mica material (Hislop & Barley, Onehunga, New Zealand) is used and a glass-reinforced "Teflon" ® sheet covers the base through which sheet heat will be transferred to the underlying plastic in order to cause a weld. The Teflon allows release afterwards. An electrical circuit for use with an "iron" includes these features:

1. switch means to change between series and parallel connection of the two heaters for faster initial heating then holding a temperature;
2. thermostatic control of the maximum temperature (placed in series between heaters and supply);
3. Optional timer to set the duration of the heating phase of the cycle (placed in series between heaters and supply);
4. Fuse (placed in series between heaters and supply) and indicator lights to show the current status of the iron.

EXAMPLE 1G

Wire Laying Patterns

FIG. 4 (with tiles shown shrunken apart for clarity) shows in plan view an area of tiles in a playground having suitable layouts for laying the stainless steel wires in loops, in a first direction (201Y1, and (optionally) returned as 201Y2, or again in a second direction 201X1, (optionally) bent back at 201XU, and returned at 201X2 in order to weld an array of tiles together with welded seams along all sides of the tiles. It will be noted that a layout should provides wire along all perimeters of all tiles.

Total wire length will be limited by the amount of power that can be inserted. Relatively long straight lines may be welded at one time, using one or more low-resistance insulated connecting leads to close the current path. Insulating sleeves such as heat-shrink sleeves may be slipped over the welding wires where they cross over other wires between the tiles in order to avoid bypassed current effects and to avoid local heating arising from poor contacts.

EXAMPLE 1H

Tensioning

FIG. 5 shows how, once welding is completed, and the wires of FIG. 4 have been cut apart and exteriorised the freed ends can be fastened to retainers which are secured to the substrate or to adjacent fixed points. Alternatively a wire stretcher could be used during welding as well. Most playground installations place tiles 101, 102 etc on a substrate that has a timber, concrete or similar surround 503. This Example shows small turnbuckles 501 that allow the tension to be precisely set on individual strands, not so high that the material of the wire becomes stretched, and distorts the tiles, but high enough to prevent the tiles from creeping, rising above the contact with the substrate, or moving laterally. The turnbuckles are anchored into the timber or other surround by a peg, screw, or the like 502 and can be covered for safety.

EXAMPLE 2

Method

The preferred method for providing a more secure array of resilient tiles for play and/or safety purposes includes the steps of:—

A. laying the array of tiles upon a prepared surface within a timber or concrete frame so that the surface is covered, as singles or as pre-welded groups (such as in squares of 2×2 tiles);

B. laying lengths of the wire across the array, within every inter-tile groove, optionally using a depth setter/positioner; (a total length to be welded at one time may be 25-30 meters long);
C. similarly laying lengths of the wire along the array, within every inter-tile groove, preferably using insulation sleeving where perpendicular wires cross;
D. and in both cases leaving sufficient protruding wire at both ends for electrical connection to be made and for subsequent ties to be made;
E. preferably applying a row of relatively strong clips (such as those of FIG. 3) across the joint or seam to be made so that a force tending to compress the joint is applied to it during the actual welding process and subsequent cooling,
F. applying an electric current through each wire in order to cause resistive heating for the wire sufficient to reach a welding temperature, and holding the temperature for an effective duration, (see previously) so that tiles become welded by their edges to adjacent tiles,
G. allowing the weld to cool before removing the clips.

The additional step of tying down the free ends of the wire to ground anchors (retainers) is not a necessary step, but if done is according to the following extra steps:
A. exteriorising the ends of each wire and about 250 mm should be available for each wire
B. coupling each free end of the wire to a retainer (502) attached to the prepared surface or the adjacent ground,
C. and applying controlled tension to or with the coupling which may be a turnbuckle (501 in FIG. 5).

If the wire is not to be used with anchors or retainers it may be clipped off flush with the edges of the tiles or inserted into crimped-on covers in order to cover the sharp ends.

VARIATIONS

Although this description relates to working with resilient PVC playground tiles that include plasticiser, a similar approach may be applied to other structures made of similar plastics especially those that are unsuitable for gluing or RF heating. This may include flooring or roofing, for example.

The process may be used to vulcanise glued joints between rubber or predominantly rubber (such as rubber with urethane mixtures) tiles, and can also be used to weld synthetic rubber.

Some other plastics, blends and mixtures that may be used for tiles (apart from the PVC that forms the majority of examples considered herein) include (as a non-limiting list): high-density polyethylene (HDPE), ethylene copolymers with vinyl acetate (EVA), polyurethane (PUR), rubber, and other elastomers, or blends thereof. There are many further possible elastomers, for instance.

INDUSTRIAL APPLICABILITY AND ADVANTAGES

As mentioned previously in this specification, there have been problems with resilient floor tiles and play tiles coming apart or coming off their substrate especially as a result of temperature excursions (20 deg F. in winter to over 120 deg F. in the summer sun). The use of a welding process provides superior tile—tile edge adherence because glue is susceptible to later becoming softened by diffusing plasticiser. The inclusion of tension-bearing elements which can be secured to lateral supports such as pegs in the ground assists in keeping the array of tiles flat and in place despite expansion and contraction.

Finally, it will be understood that the scope of this invention as described and/or illustrated herein is not limited to the specified embodiments. Those of skill will appreciate that various modifications, additions, known equivalents, and substitutions are possible without departing from the scope and spirit of the invention as set forth in the following claims.

What we claim is:

1. A continuous resilient playground or floor safety mat having a length, a width and a thickness, and laid upon or about a surface of a substrate, comprising:
   a plurality of individual thermoplastic resilient tiles, each welded along peripheral welded seams to adjacent tiles along abutted edges; and
   an embedded straight, electrically conductive, welding and securing member located within the thickness of each seam along either the length or the width of the mat, each welding and securing member having a length and two opposite ends,
   each welding and securing member being held in tension by a first end of a tensioning means attached to a first of the two opposite ends of the welding and securing member, an opposite second end of the tensioning means being held by a first anchor embedded in or about the substrate, and a second of the two opposite ends of each welding and securing member being anchored to a second anchor embedded in or about the substrate, thereby causing each welding and securing member, after welding is completed, to serve as an elongate securing member securing the mat to the surface of the substrate.

2. The continuous resilient playground or floor mat as claimed in claim 1, wherein the tensioning means is an adjustable turnbuckle provided between the welding and securing member and the first anchor.

3. The continuous resilient playground or floor mat as claimed in claim 1, wherein each tile is rectangular.

4. The continuous resilient playground or floor mat as claimed in claim 1, wherein each welding and securing member has two opposite exposed ends extending outward from a respective welded seam at opposite edges of the safety mat.

5. The continuous resilient playground or floor mat as claimed in claim 3, wherein an outer metal surface of each welding and securing member is in direct contact with opposing surfaces of the welded seams.

6. A continuous resilient playground or floor mat upon a substrate, comprising:
   a plurality of individual rectangular resilient tiles, each welded to adjacent tiles along adjacent edges forming a plurality of welded seams, the plurality of resilient tiles being anchorable to the substrate by a plurality of concealed, straight electrically conductive welding members each passing through the plurality of resilient tiles along a corresponding welded seam,
   wherein each electrically conductive member has two opposite ends extending and exposed from the plurality of resilient tiles, each exposed end being held in tension and against the substrate by an adjustable anchoring means attached at a first end to one of the ends of the conductive member and attached at a second end to an anchor embedded in the substrate.

7. The continuous resilient playground or floor mat as claimed in claim 6, wherein the adjustable anchoring means is an adjustable turnbuckle.

\* \* \* \* \*